United States Patent
Jansen et al.

(10) Patent No.: US 8,729,162 B2
(45) Date of Patent: *May 20, 2014

(54) VINYL ESTER RESIN COMPOSITIONS

(75) Inventors: Johan Franz Gradus Antonius Jansen, Geleen (NL); Ronald Ivo Kraeger, Baarn (NL)

(73) Assignee: DSM IP Assets B.V., Heerlen (NL)

( * ) Notice: Subject to any disclaimer, the term of this patent is extended or adjusted under 35 U.S.C. 154(b) by 537 days.

This patent is subject to a terminal disclaimer.

(21) Appl. No.: 12/307,392

(22) PCT Filed: Jul. 5, 2007

(86) PCT No.: PCT/EP2007/005959
§ 371 (c)(1),
(2), (4) Date: Oct. 12, 2009

(87) PCT Pub. No.: WO2008/003494
PCT Pub. Date: Jan. 10, 2008

(65) Prior Publication Data
US 2010/0029859 A1 Feb. 4, 2010

(30) Foreign Application Priority Data
Jul. 6, 2006 (EP) .................. 06014029

(51) Int. Cl.
| | | |
|---|---|---|
| *C08F 290/06* | (2006.01) | |
| *C08L 67/00* | (2006.01) | |
| *C08L 33/04* | (2006.01) | |
| *C08K 3/14* | (2006.01) | |
| *C08K 5/00* | (2006.01) | |
| *C08K 5/17* | (2006.01) | |
| *C08K 3/22* | (2006.01) | |
| *C08K 3/08* | (2006.01) | |

(52) U.S. Cl.
CPC ......... *C08L 33/04* (2013.01); *C08K 2003/2262* (2013.01); *C08K 2003/0818* (2013.01); *C08K 3/14* (2013.01); *C08K 5/0091* (2013.01); *C08K 5/17* (2013.01)
USPC ............. 524/81; 524/357; 524/604; 524/115; 528/303

(58) Field of Classification Search
CPC ........... C08L 33/04; C08K 2003/2262; C08K 2003/0818; C08K 3/14; C08K 5/0091; C08K 5/17
USPC .................. 523/456, 500; 525/168, 272, 530, 525/329.5, 49, 303, 415, 360, 15–17, 41; 524/86, 116, 115, 291, 302, 357, 604, 524/81; 528/303
See application file for complete search history.

(56) References Cited

U.S. PATENT DOCUMENTS

| | | | | |
|---|---|---|---|---|
| 5,770,653 | A | * | 6/1998 | Matsukawa et al. ........... 525/168 |
| 7,208,539 | B2 | * | 4/2007 | Tsuchikawa et al. ......... 524/415 |
| 2002/0173593 | A1 | * | 11/2002 | Udding et al. ................ 525/312 |
| 2003/0083443 | A1 | * | 5/2003 | Santobianco et al. ........ 525/530 |
| 2009/0030151 | A1 | * | 1/2009 | Jansen et al. .................... 525/21 |
| 2009/0156750 | A1 | * | 6/2009 | Jansen et al. ............... 525/329.5 |
| 2010/0069549 | A1 | * | 3/2010 | Jansen et al. ................. 524/357 |
| 2010/0069575 | A1 | * | 3/2010 | Jansen ....................... 525/329.5 |

FOREIGN PATENT DOCUMENTS

| | | |
|---|---|---|
| EP | 1 505 090 | 2/2005 |
| GB | 1 376 615 | 12/1974 |

OTHER PUBLICATIONS

International Search Report for PCT/EP2007/005959 mailed Oct. 16, 2007.
Written Opinion for PCT/EP2007/005959 mailed Oct. 16, 2007.
Malik, J.M.S.—Rev. Macromol. Chem. Phys., C40(2&3), 139-165 (2000).
Polyester Resins, Unsaturated, VCH Verlag GmbH & Co., pp. 1-10 (2005).
Science Direct, Desalination 206 pp. 300-310 (2007).
Journal of the American Chemical Society, vol. 54, No. 9 (Sep. 1932).

* cited by examiner

*Primary Examiner* — Hannah Pak
(74) *Attorney, Agent, or Firm* — Nixon & Vanderhye P.C.

(57) ABSTRACT

The present invention also relates to a vinyl ester resin composition, wherein the vinyl ester resin composition comprises a vinyl ester resin and a manganese compound, a 1,3-dioxo compound, a base; and the resin being curable with a peroxide. The present invention also relates to a process for radically curing such a resin composition wherein a peroxide is added to the resin composition and the curing is effected essentially free of cobalt.

19 Claims, No Drawings

VINYL ESTER RESIN COMPOSITIONS

This application is the U.S. national phase of International Application No. PCT/EP2007/005959 filed 5 Jul. 2007 which designated the U.S. and claims priority to European Patent Application No. 06014029.0 filed 6 Jul. 2006, the entire contents of each of which are hereby incorporated by reference.

The present invention relates to vinyl ester resin compositions that are curable with a peroxide.

The present invention further also relates to objects and structural parts prepared from such vinyl ester resin compositions by curing with a peroxide. The present invention finally also relates to methods of peroxide curing of such vinyl ester resin compositions.

As meant herein, objects and structural parts are considered to have a thickness of at least 0.5 mm and appropriate mechanical properties. The term "objects and structural parts" as meant herein also includes cured resin compositions as are used in the field of chemical anchoring, construction, roofing, flooring, windmill blades, containers, tanks, pipes, automotive parts, boats, etc.

As meant herein the term gel-time drift (for a specifically selected period of time, for instance 30 or 60 days) reflects the phenomenon, that—when curing is performed at another point of time than at the reference standard moment for curing, for instance 24 hours after preparation of the resin—the gel time observed is different from that at the point of reference. For vinyl ester resins, as can generally be cured under the influence of peroxides, gel time represents the time lapsed in the curing phase of the resin to increase in temperature from 25° C. to 35° C. Normally this corresponds to the time the fluidity (or viscosity) of the resin is still in a range where the resin can be handled easily. In closed mould operations, for instance, this time period is very important to be known. The lower the gel-time drift is, the better predictable the behavior of the resin (and the resulting properties of the cured material) will be.

W. D. Cook et al. in Polym. Int. Vol. 50, 2001, at pages 129-134 describe in an interesting article various aspects of control of gel time and exotherm behavior during cure of unsaturated polyester resins. They also demonstrate how the exotherm behavior during cure of such resins can be followed. FIGS. 2 and 3 of this article show the gel times in the bottom parts of the exotherms measured. Because these authors focus on the exotherms as a whole, they also introduced some correction of the exotherms for heat loss. As can be seen from the figures, however, such correction for heat loss is not relevant for gel times below 100 minutes.

Gel time drift (hereinafter: "Gtd") can be expressed in a formula as follows:

$$\mathrm{Gtd} = (T_{25 \to 35°\,C.\,at\,y\text{-}days} - T_{25\text{-}35°\,C.\,after\,mixing}) / T_{25 \to 35°\,C.\,after\,mixing} \times 100\% \quad \text{(formula 1)}$$

In this formula $T_{25 \to 35°\,C.}$ (which also might be represented by $T_{gel}$) represents, as mentioned above, the time lapsed in the curing phase of the resin to increase in temperature from 25° C. to 35° C. The additional reference to "at y days" shows after how many days of preparing the resin the curing is effected.

All resins, by their nature, undergo some changes over time from their production till their actual curing. One of the characteristics where such changes become visible is the gel-time drift. The state of the art vinyl ester resin systems generally are being cured by means of initiation systems. In general, such vinyl ester resin systems are cured under the influence of peroxides and are accelerated (often even pre-accelerated) by the presence of metal compounds, especially cobalt salts, as accelerators. Cobalt naphthenate and cobalt octanoate are the most widely used accelerators. In addition to accelerators, the polyester resins usually also contain radical inhibitors for ensuring that the resin systems do not gellify prematurely (i.e. that they have a good storage stability). Furthermore, radical inhibitors are being used to ensure that the resin systems have an appropriate gel time and/or for adjusting the gel-time value of the resin system to an even more suitable value.

Most commonly, in the state of the art, polymerization initiation of vinyl ester resins, etc. by redox reactions involving peroxides, is accelerated or pre-accelerated by a cobalt compound in combination with another accelerator.

An excellent review article of M. Malik et al. in J.M.S.—Rev. Macromol. Chem. Phys., C40(2&3), p. 139-165 (2000) gives a good overview of the current status of resin systems. Curing is addressed in chapter 9. For discussion of control of gel time reference can be made to the article of Cook et al. as has been mentioned above. Said article, however, does not present any hint as to the problems of gel-time drift as are being solved according to the present invention.

The phenomenon of gel-time drift, indeed, so far got quite little attention in the literature. Most attention so far has been given in literature to aspects of acceleration of gel time in general, and to improving of pot-life or shelf life of resins. The latter aspects, however, are not necessarily correlated to aspects of gel-time drift, and so, the literature until now gives very little suggestions as to possible solutions for improvement of (i.e. lowering of) gel-time drift. For instance, reference can be made to a paper presented by M. Belford et al., at the Fire Retardant Chemicals Association Spring Conference, Mar. 10-13, 2002 where the gel-time reducing effect of a new antimony pentoxide dispersion (NYACOL APE 3040) has been addressed in fire retardant polyester resins promoted with cobalt.

Accordingly, for the vinyl ester resins as are part of the current state of the art, there is still need for finding resin systems showing reduced gel-time drift, or in other words, resin systems having only slight gel-time drift when cured with a peroxide. Preferably the mechanical properties of the resin composition after curing with a peroxide are unaffected (or improved) as a result of the changes in the resin composition for achieving the reduced gel-time drift. Moreover, for environmental reasons, the presence of cobalt in the resins is less preferred.

The present inventors now, surprisingly, found that efficient curing of vinyl ester resin systems with a peroxide could be obtained by using vinyl ester resin compositions comprising a vinyl ester resin and a manganese compound, a 1,3-dioxo compound and a base. According to the present invention resin compositions having good cure characteristics can be obtained, i.e. the resin compositions according to the invention have short gel time, short peak time and/or high peak temperature. In the curing of vinyl ester resins, gel time is a very important characteristic of the curing properties. In addition also the time from reaching the gel time to reaching peak temperature, and the level of the peak temperature (higher peak temperature generally results in better curing) are important.

In addition, according to the present invention resin compositions having reduced gel-time drift are obtained.

GB-1376615 describes a two-component composition reactable to a resin composition on mixing of the two components in which the components are stored separately and are mixed at the time of use; the first component comprises an acrylic or methacrylic ester as a main base and a metal chelate compound; the second component comprising an acrylic or methacrylic ester and a peroxide which by itself does not cause the acrylic or methacrylic ester to harden at room temperature. The main base may further be provided with a hardening accelerator, for example, N,N-dimethylformamide, amines such as triethylamine and tri-n-butylamine, carboxylic acids and carboxylic anhydrides. The metal chelate compound is a β-diketone chelate or ketoester chelate of copper, zinc, aluminium, titanium, vanadium, chromium, manganese, iron, cobalt or nickel. In Example 4, 50 parts of trimethylol propane trimethacrylate, 50 parts of glycidyl methacrylate, 0.4 part Mn(II)acetylacetonate and 1 part of triethylamine (component A-4) are mixed with component B-1 consisting of 0.05 part of p-benzoquinone, 5 parts of cumene hydroperoxide in 100 parts of tetraethylene glycol dimethacrylate. This document does not disclose that the resin composition comprises aβ-diketone compound as such. A disadvantage of the resin composition comprising Mn(II) acetylacetonate is that the composition and the cured parts obtained there from are colored dark-brown.

It has been found that with the present invention a resin composition can be obtained with a low gel time and that by using the accelerating system comprising a manganese compound, a 1,3-dioxo compound and a base almost colourless objects can be obtained.

WO-A-9012825 discloses an accelerator composition for the curing of unsaturated polyester resins comprising a complex of a salt of at least one metal selected from the group consisting of lithium, magnesium, manganese, copper, cobalt, vanadium and iron, and an organic oxygen-containing compound capable of forming a metal complex with said metal salt including at least one functional group selected from the group consisting of an aldehyde, ketone, ether, ester or alcohol group. There is no indication in this reference that acceleration can also be achieved with a manganese compound, a 1,3-dioxo compound and a base.

Besides, H. Yang and L. J. Lee (J. Appl. Polym. Sci., vol 79, p 1230, y 2001) describe in their excellent article that acetylacetone is a commonly used retarder for vinyl esters. So in the literature there is no indication that a manganese compound, a 1,3-dioxo compound and a base form a good accelerator for the decomposition of peroxides.

The vinyl ester as is comprised in the vinyl ester resin compositions according to the present invention may suitably be selected from the vinyl ester resins as are known to the skilled man. Vinyl ester resins are mostly used because of their hydrolytic resistance and excellent mechanical properties, as well as for their low styrene emission. Vinyl ester resins having unsaturated sites only in the terminal position are for example prepared by reaction of epoxy resins (e.g. diglycidyl ether of bisphenol-A, epoxies of the phenol-novolac type, or epoxies based on tetrabromobisphenol-A) with for example (meth)acrylic acid. Instead of (meth)acrylic acid also (meth)acrylamide may be used. As used herein, a vinyl ester resin is a (meth)acrylate functional resin. Besides the vinyl ester resins as described in Malik et al., also the class of vinyl ester urethane resins (also referred to urethane methacrylate resins) can be distinguished as vinyl ester resins. Preferably, the vinyl ester used in the present invention is a resin obtained by the esterification of an epoxy resin with (meth)acrylic acid or (meth)acrylamide.

These resins, as can suitably used in the context of the present invention, may be modified according to methods known to the skilled man, e.g. for achieving lower acid number, hydroxyl number or anhydride number, or for becoming more flexible due to insertion of flexible units in the backbone, etc.

Of course, also other reactive groups curable by reaction with peroxides may be present in the vinyl ester resins, for instance reactive groups derived from itaconic acid, citraconic acid and allylic groups, etc. Accordingly, the vinyl ester resins used in the present invention may contain solvents. The solvents may be inert to the resin system or may be reactive therewith during the curing step. Reactive solvents are particularly preferred. Examples of suitable reactive solvents are styrene, α-methylstyrene, (meth)acrylates, N-vinylpyrrolidone and N-vinylcaprolactam.

The resin composition according to the invention preferably has an acid value in the range of from 0.001-300 mg KOH/g of resin composition. As used herein, the acid value of the resin composition is determined titrimetrically according to ISO 2114-2000. Preferably, the molecular weight of the vinyl ester resin is in the range of from 500 to 200,000 g/mole. As used herein, the molecular weight of the resin is determined using gel permeation chromatography according to ISO 13885-1.

The resin composition generally contains less than 5 wt. % water.

In the context of the invention all kinds of manganese compounds can be used. According to the invention, the manganese compound present in the resin composition is preferably a manganese salt or complex. More preferably, the manganese compound is a manganese$^{2+}$ salt or complex or a manganese$^{3+}$ salt or complex. Even more preferably, the manganese compound is a manganese$^{2+}$ salt or manganese$^{3+}$ salt. The manganese$^{2+}$ salt is preferably an organic manganese$^{2+}$ salt. The manganese$^{3+}$ salt is preferably an organic manganese$^{3+}$ salt. The organic manganese$^{2+}$ salt or the organic manganese$^{3+}$ salt is preferably a manganese carboxylate or a manganese acetoacetate, more preferably a manganese carboxylate. It will be clear that, instead of a single manganese compound also a mixture of manganese compounds can be used.

The manganese compound is preferably present in the resin composition according to the invention in an amount of at least 0.01 mmol Mn per kg of primary resin system preferably higher than 0.1 mmol Mn per kg primary resin system. The upper limit of the manganese content is not very critical, although for reasons of cost efficiency of course no extremely high concentrations will be applied. Generally the concentration of the manganese compound in the primary resin system will be lower than 100 mmol Mn per kg of primary resin system preferably lower than 10 mmol Mn per kg of primary resin system.

For understanding of the invention, and for proper assessment of the amounts of manganese compound to be present in the resin composition, the term "primary resin system" as used herein is understood to mean the total weight of the resin, but excluding any fillers as may be used when applying the resin system for its intended uses. The primary resin system therefore consists of the vinyl ester resin, any additives present therein (except for the peroxide component that is to be added shortly before the curing) for soluble in the resin, such as accelerators, promoters, inhibitors, low-profile agents, colorants (dyes), thixotropic agents, release agents etc., as well as styrene and/or other solvents as may usually be present therein. The amount of additives soluble in the resin usually may be as from 1 to 25 wt. % of the primary resin system; the amount of styrene and/or other solvent may be as large as up to 50 wt. % of the primary resin system. The primary resin system, however, explicitly does not include compounds not being soluble therein, such as fillers (e.g. glass or carbon fibers), talc, clay, solid pigments (such as, for instance, titanium dioxide (titanium white)), flame retardants, e.g. aluminium oxide hydrates, etc.

The 1,3-dioxo compound is preferably a compound having the following formula:

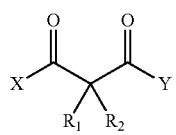

(1)

whereby
X,Y=H, $C_1$-$C_{20}$ alkyl, $C_6$-$C_{20}$ aryl, alkylaryl, arylalkyl, part of a polymer chain, $OR^3$, $NR^3R^4$;
$R^1$, $R^2$, $R^3$, and $R^4$ each individually may represent hydrogen (H), or a $C_1$-$C_{20}$ alkyl, $C_6$-$C_{20}$ aryl, alkylaryl or arylalkyl group, that each optionally may contain one or more hetero-atoms (e.g. oxygen, phosphor, nitrogen or sulphur atoms) and/or substituents; a ring may be present between $R^1$ and $R^2$, $R^1$ and $R^3$, and/or between $R^2$ and $R^4$; $R^3$ and/or $R^4$ may be part of a polymer chain, may be attached to a polymer chain or may contain a polymerizable group. Preferably, X and/or Y are/is $C_1$-$C_{20}$ alkyl and/or $C_1$-$C_{20}$ aryl. More preferably, X and/or Y are/is a methyl group. Preferably, the 1,3-dioxo compound is acetylaceton. The 1,3-dioxo compound may be a polymer or is polymerizable.

Preferably, the amount of the 1,3-dioxo compound is from 0.05 to 5% by weight, calculated on the total weight of the primary resin system. More preferably, amount of the 1,3-dioxo compound is from 0.1 to 2% by weight.

Preferably, the base present in the resin composition according to the present invention is an organic base with $pK_a \geq 10$ or the base is an alkali metal or earth alkali metal compound. More preferably, the base is an alkali metal or earth alkali metal compound. The organic base with $pK_a \geq 10$ is preferably a nitrogen-containing compound, preferably an amine, more preferably a tertiary amine. The alkali metal or earth alkali metal compound is preferably an oxide, hydroxide, carboxylate, carbonate or hydrocarbonate. Preferably, the alkali metal is not lithium and the earth alkali metal is not magnesium in view of the low solubility of lithium and magnesium compounds in the resin composition. Most preferably, the base is a potassium compound. The potassium compound is preferably a potassium carboxylate, preferably a potassium $C_6$-$C_{20}$ carboxylate. In a preferred embodiment of the present invention, the potassium carboxylate is in-situ formed by adding potassium hydroxide to the resin composition.

Preferably, the amount of the base is from from 0.001 to 2000 mmol/kg of primary resin system, more preferably from 0.01 to 1000 mmol/kg of primary resin system. More preferably, the amount of the base is from 1 to 150 mmol/kg of primary resin system.

In the resin composition according to the present invention, the molar ratio between manganese and the basic functionality of the base is preferably from 1:1 to 1:1500, preferably from 1:5 to 1:60. The molar ratio between the dioxo-compound and the basic functionality of the base is preferably from 170:1 to 1:30, preferably from 13:1 to 1:3. The molar ratio between manganese and the dioxo compound is preferably from 1:3 to 1:5000 and more preferably from 1:3 to 1:400.

These resins all can be cured by means of peroxide curing. The peroxides used for the initiation can be any peroxide known to the skilled man for being used in curing of vinyl ester resins. Such peroxides include organic and inorganic peroxides, whether solid or liquid; also hydrogen peroxide may be applied. The peroxides can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

Preferably, the peroxide is chosen from the group of organic peroxides. Examples of suitable organic peroxides are: tertiary alkyl hydroperoxides (such as, for instance, t-butyl hydroperoxide), other hydroperoxides (such as, for instance, cumene hydroperoxide), the special class of hydroperoxides formed by the group of ketone peroxides (perketones) (such as, for instance, methyl ethyl ketone peroxide and acetylacetone peroxide), peroxyesters or peracids (such as, for instance, t-butyl peresters, benzoyl peroxide, peracetates and perbenzoates, lauryl peroxide, including (di)peroxyesters), perethers (such as, for instance, peroxy diethyl ether). Often the organic peroxides used as curing agent are tertiary peresters or tertiary hydroperoxides, i.e. peroxy compounds having tertiary carbon atoms directly united to an —OO-acyl or —OOH group. Clearly also mixtures of these peroxides with other peroxides may be used in the context of the present invention. The peroxides may also be mixed peroxides, i.e. peroxides containing any two of different peroxygen-bearing moieties in one molecule). In case a solid peroxide is being used for the curing, the peroxide is preferably benzoyl peroxide (BPO).

Most preferably, however, the peroxide is a liquid hydroperoxide. The liquid hydroperoxide, of course, also may be a mixture of hydroperoxides. Handling of liquid hydroperoxides when curing the resins for their final use is generally easier: they have better mixing properties and dissolve more quickly in the resin to be cured.

In particular it is preferred that the peroxide is selected from the group of ketone peroxides, a special class of hydroperoxides. The peroxide being most preferred in terms of handling properties and economics is methyl ethyl ketone peroxide (MEK peroxide).

In a preferred embodiment of the invention, the resin composition according to the invention also contains one or more reactive diluents, preferably in an amount of at least 5 weight %.

Such reactive diluents are especially relevant for reducing the viscosity of the resin in order to improve the resin handling properties, particularly for being used in techniques like vacuum injection, etc. However, the amount of such reactive diluent in the resin composition according to the invention is not critical. Preferably, the reactive diluent is a methacrylate and/or styrene.

In a further preferred embodiment of the present invention, the resin composition also contains one or more radical inhibitors.

More preferably, the resin compositions according to the invention contain one or more radical inhibitors selected from the groups of phenolic compounds, stable radicals like galvinoxyl and N-oxyl based compounds, catechols and/or phenothiazines.

The amount of radical inhibitor as used in the context of the present invention, may, however, vary within rather wide ranges, and may be chosen as a first indication of the gel time as is desired to be achieved. Preferably, the amount of phenolic inhibitor is from about 0.001 to 35 mmol per kg of primary resin system, and more preferably it amounts to more than 0.01, most preferably more than 0.01 mmol per kg of primary resin system. The skilled man quite easily can assess, in dependence of the type of inhibitor selected, which amount thereof leads to good results according to the invention.

Suitable examples of radical inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis (3-methyl-6-t-butylphenol), 4,4-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl -2,2,5,5-tetramethylpyrrolidine, 1-oxyl -2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

Advantageously, the amount of radical inhibitor in the resin composition according to the invention is in the range of from 0.0001 to 10% by weight, calculated on the total weight of the primary resin system of the resin composition. More preferably, the amount of radical inhibitor in the resin composition is in the range of from 0.001 to 1% by weight.

In specifically preferred embodiments of the invention the resin composition is essentially free of cobalt. Essentially free of cobalt means that the cobalt concentration is lower than 0.01 mmol Co per kg primary resin system, preferably lower than 0.001 mmol Co per kg primary resin system. Most preferably the resin composition is free of cobalt.

The vinyl ester resin composition according to the present invention can be applied in all applications as are usual for such types of resins. In particular they can suitably used in closed mould applications, but they also can be applied in open mould applications. For closed mould applications it is especially important that the manufacturer of the closed mould products reliably can use the favorable (i.e. reduced) gel-time drift tendency of the resin compositions according to the invention. End segments where the vinyl ester resin compositions according to the present invention can be applied are also marine applications, chemical anchoring, roofing, construction, relining, pipes & tanks, flooring, windmill blades, etc. That is to say, the resin compositions according to the invention can be used in all known uses of vinyl ester resins.

The present invention further also relates to all such objects or structural parts as are being obtained when curing the vinyl ester resin compositions according to the invention. These objects and structural parts have excellent mechanical properties.

The present invention further also relates to a process for radically curing a vinyl ester resin composition comprising a vinyl ester resin by adding a manganese compound, a 1,3-dioxo compound, a base and a peroxide to said resin composition. Preferably, the manganese compound, the 1,3-dioxo compound and the base are firstly added to the resin composition comprising vinyl ester and the peroxide is added to the so obtained resin composition. It has surprisingly been found that the combination of the manganese compound, the 1,3-dioxo compound and the base accelerates the radically curing of the vinyl ester with the peroxide. The curing is preferably effected at a temperature in the range of from −20 to +200° C., preferably in the range of from −20 to +100° C., and most preferably in the range of from −10 to +60° C. (so-called cold curing). In a preferred embodiment the curing is effected essentially free of cobalt.

The invention is now demonstrated by means of a series of examples and comparative examples. All examples are supportive of the scope of claims. The invention, however, is not restricted to the specific embodiments as shown in the examples.

Monitoring of Curing

In most of the Examples and Comparative Examples presented hereinafter it is mentioned, that curing was monitored by means of standard gel time equipment. This is intended to mean that both the gel time ($T_{gel}$ or $T_{25->35° C.}$) and peak time ($T_{peak}$ or $T_{25->peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30.

For some of the Examples and Comparative Examples also the gel-time drift (Gtd) was calculated. This was done on the basis of the gel times determined at different dates of curing according to formula 1:

$$Gtd = (T_{25->35° C.\ at\ y\text{-}days} - T_{25->35° C.\ after\ mixing}) / T_{25->35° C.\ after\ mixing} \times 100\%$$ (formula 1)

with "y" indicating the number of days after mixing.

EXAMPLE 1 AND COMPARATIVE EXPERIMENTS A-C

To 500 g Daron XP-45 (a vinyl ester resin diluted in styrene; commercially available from DSM) was added 0.0633 g (0.5 mmol Mn/kg resin) Mn(acac)$_2$. This mixture was divided in 4 portions of 100 g each, which were cured at 25° C. using acetyl acetone as 1,3-dioxo compound, triethyl amine as base and 3% (relative to primary resin system) Butanox M-50 as peroxide (a MEK peroxide solution, commercially available from Akzo Nobel Chemicals Inc.).

The cure was monitored with the gel timer and the results are shown in table 1.

TABLE 1

|  | 1,3-dioxo (%) | base (%) | gel time (min) |
|---|---|---|---|
| Example 1 | 1 | 1 | 63 |
| Comp. Exp. A | 0 | 0 | >120 |
| Comp. Exp. B | 1 | 0 | >120 |
| Comp. Exp. C | 0 | 1 | >120 |

These results indicate that an efficient curing could only be obtained with combination according to the invention.

EXAMPLE 2

Example 1 was repeated except 0,2289 g Mn ethylhexanoate solution (6% Mn metal) was used instead of Mn(acac)$_2$. Employing 1% acetyl acetone as the 1,3 dioxo compound together with 1% (relative to primary resin system) triethyl amine using 3% (relative to primary resin system) Butanox M-50 as peroxide resulted in a gel time of 3.7 min.

This result indicates that besides Mn acetoacetonates also Mn carboxylates can be used. Moreover this result indicates that employing Mn carboxylates results in a faster curing.

EXAMPLES 3A-3E AND COMP. EXP. D AND E

Several formulations were prepared based on 40 g SR231 (Cray Valley) which was mixed with x g Mn ethylhexanoate solution (6% Mn in spirits), y g acetyl acetone and z g K octanoate in PEG (15% K). After stirring for 5 min curing was performed with 3% (relative to primary resin system) Butanox M-50 and the results are shown in the table 2.

TABLE 2

| Ex | Mn (g) | AcAc (g) | K (g) | Tgel (min) | Tpeak (min) | Temp (° C.) |
|---|---|---|---|---|---|---|
| 3a | 0.007 | 0.407 | 0.401 | 50 | 53.3 | 195 |
| 3b | 0.038 | 0.396 | 0.399 | 2.7 | 39.7 | 194 |
| 3c | 0.037 | 0.200 | 0.402 | 55 | 64 | 174 |
| 3d | 0.037 | 0.800 | 0.413 | 2.8 | 17.5 | 204 |
| 3e | 0.038 | 0.407 | 0.080 | 8.5 | 11.3 | 202 |
| comp D | 0.038 | 0 | 0.411 | >240 | | |
| comp E | 0.038 | 0.398 | 0 | >240 | | |

These example demonstrate that multiple amounts of Mn, 1,3 dioxo and base can be used according to the invention.

EXAMPLE 4

Example 3 was repeated using 0.038 g Mn solution (6% Mn), 0.4 g acetylacetone and 0.22 g lithium neodecanoate solution (2% Li) or 0.057 g N,N-dimethylethanolamine. The results are shown below in table 3.

TABLE 3

| ex | base | Tgel (min) | Tpeak (min) | Temp (° C.) |
|---|---|---|---|---|
| 4a | Li | 22.5 | 26 | 205 |
| 4b | Me2NEtOH | 3 | 9.6 | 202 |

These results indicate that various bases can be used.

EXAMPLES 5A-5D

Several formulations were prepared based on 40 g SR231 (Cray Valley) which was mixed with 0.12 g Mn ethylhexanoate solution (6% Mn in spirits), 0.4 g acetyl acetone and 0.4 g K octanoate in PEG (15% K). After stirring for 5 min curing was performed with 1.2 g of various peroxides (all commercially available from Akzo Novel Inc.) and the results are shown in the table 4.

TABLE 4

| ex | peroxide | Tgel (min) | Tpeak (min) | Temp (° C.) |
|---|---|---|---|---|
| 5a | Trigonox 44B | 3.2 | 7.2 | 196 |
| 5b | Trigonox AW70 | 20.2 | 28.5 | 193 |
| 5c | Trigonox 21 | 56 | 72 | 182 |
| 5d | Perkadox CH-50L | 32.2 | 39.3 | 176 |

These results indicate the various types of peroxide can be used to cure vinyl esters according to the invention.

EXAMPLE 6

The formulation of example 3a was prepared on a 200 g scale. After stirring for 5 min the formulation was divided in 2 portions of 100 g each. The first portion was immediately cured with 3% (relative to primary resin system) Butanox M-50 resulting in a gel time of 50 min. The second portion was cured after 30 days of storage and the cure characteristics were: gel time 51 min, peak time 56 min peak temperature 195° C. meaning a gel time drift of only 2% after 30 days.

This result indicates that formulations with a low gel time drift tendency can be obtained according to the invention.

The invention claimed is:

1. A cured vinyl ester resin composition, comprising a primary resin system comprising:
   (a) a peroxide cured vinyl ester resin,
   (b) a manganese compound which is a manganese carboxylate or a manganese acetoacetate,
   (c) a 1,3-dioxo compound having the following formula:

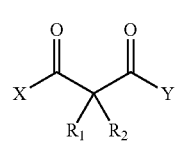

(1)

wherein,
X,Y=H, $C_1$-$C_{20}$ alkyl, $C_6$-$C_{20}$ aryl, alkylaryl, arylalkyl, part of a polymer chain, $OR_3$, $NR_3R_4$; $R_1$, $R_2$, $R_3$, and $R_4$ each individually may represent hydrogen (H), or a $C_1$-$C_{20}$ alkyl, $C_6$-$C_{20}$ aryl, alkylaryl or arylalkyl group, that each optionally may contain one or more heteroatoms selected from the group consisting of oxygen, phosphor, nitrogen and sulphur atoms; and/or substituents;

a ring may be present between $R_1$ and $R_2$, $R_1$ and $R_3$, and/or between $R_2$ and $R_4$;

$R_3$ and/or $R_4$ may be part of a polymer chain, may be attached to a polymer chain or may contain a polymerizable group, and (d) a base, wherein the base is an organic base with pKa≥10 selected from amines or the base is an alkaline metal or earth alkaline metal compound, wherein the amount of the 1,3-dioxo compound is between 0.05 and 5% by weight, calculated on the total weight of the primary resin system, and wherein the base is present in an amount of from 0.001 to 2000 mmol/kg of the primary resin system, and wherein the composition has a molar ratio between the manganese compound and a basic functionality of the base of 1:1 to 1:1500.

2. The resin composition according to claim 1, wherein the manganese compound is present in an amount of 0.01 to 100 mmol manganese per kg of primary resin system.

3. The resin composition according to claim 1, wherein X and/or Y are/is $C_1$-$C_{20}$ alkyl and/or $C_1$-$C_{20}$ aryl.

4. The resin composition according to claim 1, wherein X and/or Y is a methyl group.

5. The resin composition according to claim 4, wherein the 1,3-dioxo compound is acetylacetone.

6. The resin composition according to claim 1, wherein the metal base is a potassium compound.

7. The resin composition according to claim 1, wherein the composition has a molar ratio between the dioxo compound and a basic functionality of the base of 170:1 to 1:30.

8. The resin composition according to claim 1, wherein the composition has a molar ratio between the manganese compound and the dioxo compound of 1:3 to 1:5000.

9. The resin composition according to claim 1, further comprising a radical inhibitor.

10. The resin composition according to claim 1, wherein the resin composition is essentially free of cobalt.

11. Objects and structural parts which comprise the peroxide cured resin composition according to claim 1.

12. The resin composition according to claim 1, wherein the peroxide is at least one selected from the group consisting of hydroperoxides, perethers and perketones.

13. The resin composition according to claim 12, wherein the peroxide is methylethylketone peroxide.

14. The resin composition according to claim 1, wherein the amine base is a tertiary amine.

15. The resin composition according to claim 6, wherein the potassium compound is a potassium carboxylate.

16. The resin composition according to claim 1, wherein the molar ratio between the manganese compound and the basic functionality of the base is 1:5 to 1:60.

17. The resin composition according to claim 7, wherein the molar ratio between the dioxo compound and the basic functionality of the base is 13:1 to 1:30.

18. The resin composition according to claim 8, wherein the molar ratio between the manganese compound and the dioxo compound is 1:3 to 1:400.

19. The resin composition according to claim 9, wherein the radical inhibitor is at least one selected from the group consisting of phenolic compounds, stable radicals, catechols and phenothiazines.

* * * * *